455/12 X5019D

United States Patent [11] 3,710,027
Herter et al. [45] Jan. 9, 1973

[54] SYSTEM OF TIME-DIVISION MULTIPLEX TRANSMISSION VIA COMMUNICATIONS SATELLITES

[75] Inventors: Eberhard Herter, Stuttgart; Peter Conrad Ulrich, Heutigsheim, both of Germany

[73] Assignee: International Standard Electric Corporation, New York, N.Y.

[22] Filed: Oct. 27, 1970

[21] Appl. No.: 84,287

[30] Foreign Application Priority Data

Nov. 22, 1969 Germany....................P 19 58 673.3

[52] U.S. Cl...........................179/15 BS, 178/69.5 R
[51] Int. Cl...............................................H04j 3/06
[58] Field of Search...........179/15 BA, 15 BS; 325/4; 178/69.5 R

[56] References Cited

UNITED STATES PATENTS 3,526,719 9/1970 Puente..................................325/4 X
3,551,813 12/1970 Kaneko..................................325/4

*Primary Examiner*—Ralph D. Blakeslee
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A system at each station is described to detect the beginning of a message first containing a start signal and to detect the station address in a TDMA system. The system stores detected suspected signals for a number of preceding frames that occur in an expected time slot. A first majority decision is made with respect to the stored start signal and if a positive decision is made the next detected start signal is accepted for processing. A positive decision for the start signal majority decision enables the station addresses to be evaluated by a second majority decision. This arrangement eliminates the need of redundancy codes for the start signal and the station address, said redundancy codes occupying too much space in the available time slot.

9 Claims, 2 Drawing Figures

3710027
OR IN 179/15BS

INVENTORS
EBERHARD HERTER
PETER C. ULRICH
BY Alfred C. Hill
AGENT

INVENTORS
EBERHARD HERTER
PETER C. ULRICH

BY Alfred C. Hill
AGENT

SYSTEM OF TIME-DIVISION MULTIPLEX TRANSMISSION VIA COMMUNICATIONS SATELLITES

BACKGROUND OF THE INVENTION

Time division multiple access (TDMA) systems permit radio communication among a large number of earth stations via a satellite. In the most simple case the satellite acts as a repeater station serving several fixed point-to-point communications. When providing a corresponding additional expenditure, the channel-wise relaying of the point-to-point communication becomes possible.

Pulse code modulation (PCM), for example, is used as the modulation method. The PCM-pulses of the individual stations are transmitted to the satellite in the form of message bursts. Transmitting time positions of the individual bursts are chosen so that they will arrive at the satellite in successive time sequence without overlapping.

In an asynchronously operating TDMA system, the PCM frames are subjected to compression at each earth station. There are included some additional control pulses. First, a sequence of synchronization bits for effecting the carrier and bit synchronization of the burst. (Synchronization must be effected separately with respect to each burst, because transit-time variations may effect the phase relation of the burst, and because the individual earth stations are not synchronized among each other). Second, there is included a code word for exactly identifying the beginning of the burst, for identifying the transmitting station, and for transmitting exchange or relaying information.

Moreover, there is to be provided a safety spacing or guard space between the bursts, preventing the bursts from overlapping. The individual channels are combined in a known way to form one total frame.

With respect to transmission and reception it is important to know the exact time position of the beginning of the message burst as well as the address of the respective transmitting station. Since, on the transmission path, the information to be transmitted might be subject to disturbances, it would be necessary for the coded information concerning the beginning of the transmit-time and the address to be made redundant to such an extent that the information, subjected to disturbances, can still be evaluated with a sufficient reliability. Such types of redundant information, however, occupy too much space during the available message burst or channel time.

In order to be able to operate with less redundant information, a system has been proposed in which a master station determines the time slot of each station within a total frame, and informs each of the stations accordingly. Each of the stations store their given time slot information information. The given time slot information of each station corresponds to the exact time position of the burst start of each station in the TDMA frame. In each station, upon commencement of each received total frame (this frame being given, for instance by the received start signal of the master station), a time metering arrangement is started, (, for instance, a frame counter which is reset every frame time), whose momentary reading, upon commencement of a new message burst, is compared with the given and stored time slot information. In the case of a difference between the given (from the store) and the metered (from the counter) time slots for each station, there is derived a control criterion (the magnitude and polarity of the time difference between these two time slots) for the next transmission, and at the same time the difference value is stored as a value of alteration of its own burst transmit time. During the following comparisons where a difference results corresponding to the value of alteration, the transmission of a control criterion is suppressed until there has elapsed a time equal to time for a round trip to the satellite.

In this proposed system, the order of sequence (the sequence of the earth stations in the TDMA frame), etc., is always known in advance. It is also possible, however, that systems have to be provided in which the necessary information (concerning the beginning of the burst) is derived directly from the received information (burst start signals derived from the burst start code pattern included in the respective burst messages).

An example of such burst transmission control is given in the article by O. G. Gabbard entitled "Design of a Satellite Time-Division Multiple-Access Burst Synchronizer", IEEE Transaction, Vol. COM-16, No. 4, pages 589–596.

SUMMARY OF THE INVENTION

An object of the present invention is to provide a system to obtain the time of the beginning of a message burst (time slot) directly from the received information without employing redundancy codes.

Another object of the present invention is to provide a system to obtain the time of the beginning of a message burst and station address directly from the received information without employing redundancy codes.

The present invention is based on the problem of providing a system for detecting the beginning of the transmit time of the message bursts and of the addresses of various stations within an asynchronous time-division multiplex transmission system via communications satellites, in which to the control unit there is neither known the order of sequence nor the position or number of the participating stations, and which, moreover, only requires information of very small redundance. According to the invention this is accomplished in that, upon reception of a burst start signal, which is derived by the detection of a burst code (unique word) included in the data sequence, there is stored an a signal (code signal) indicating the reception of said start signal, that the time position of occurrence of this signal is compared with the corresponding time positions of preceding frames, that upon occurrence of this signal in several successively following frames within the same time slot, the newly received burst start signal is released to be processed further, that the address associated with the burst start signals are likewise stored and compared, and that subsequently to the occurrence of the same address at same time slots in several successively following frames, the address is released to be processed further.

One further embodiment of the invention resides in the fact that the start signals are stored in a shift register, and are then shifted through, that the shifting-through time corresponds to the duration of several frames, that in intervals corresponding to the duration of one frame, there are provided tapping points, and that the signals appearing at these tapping points are used to make a majority decision.

Another further embodiment of the invention resides in the fact that the section of the shift register up to the first tapping point is slightly shortened, that the majority decision is made with the already stored signals, and that in the case of a positive decision, a gating circuit is opened for a predetermined period of time, and that the arriving start signal is forwarded via this opened gating circuit for being processed and simultaneously is stored, in parallel form in said shift register.

A feature of this invention is the provision of a system for detecting in a frame period the beginning of the transmit-time of both the message burst and the address of each of a plurality of different stations in an asynchronous time division multiplex communication system via a communications satellite comprising a source of bit stream including an address code and a message burst start signal code; first means coupled to the source to detect the address code in a given time slot of each of the frame periods; second means coupled to the first means to detect the start signal code in the given time slot of each of the frame periods and produce an identifying signal when the start signal is thusly detected; third means coupled to the second and first means to store the identifying signal of the preceding N frame periods and to store the address code of the corresponding preceding N frame periods, where N is an integer greater than two; fourth means coupled to the second means and the third means to determine by a first majority decision the actual presence of the start signal in the given time slot and to pass the next one of the start signal code for processing upon occurrence of a first positive majority decision; and fifth means coupled to the first means, the third means and the fourth means to determine, in response to the first positive majority decision, by a second majority decision the actual presence of the address code in the given time slot and to pass the next one of the address code for processing upon occurrence of a second positive majority decision.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
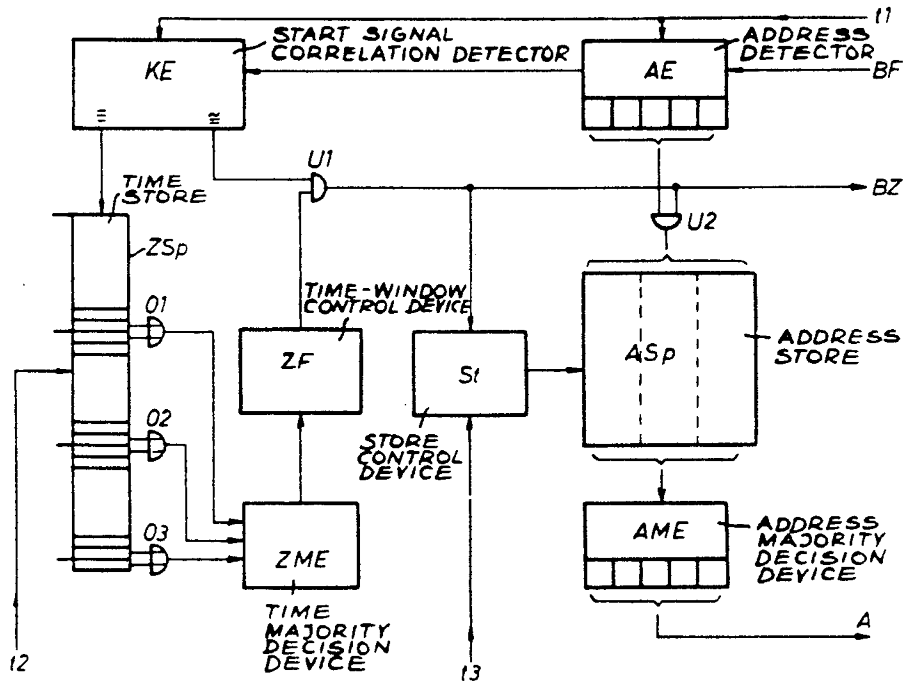
FIG. 1 shows a block diagram of first embodiment of the detection system in accordance with the principles of the present invention.

The incoming sequence of bits BF (FIG. 1) is applied to an address detector or receiver AE, and from there to a start signal correlation detector or receiver KE serving to recognize the start signal for transmitting a burst. The sequence of bits BF is forwarded by the bit clock $t1$.

A description of a correlation detector that can be employed for detector KE is given in the article by W. Schrempp and T. Sekimoto entitled "Unique Word Detection in Digital Burst Communications", IEEE Transactions, Vol. COM-16, No. 4, pages 597–605.

The correlator KE is able to detect start codes which may contain errors up to a certain amount which depends on the construction of the detector. If a start code is detected containing no errors, both outputs, meaning all bits correct, ≅ meaning the start code contains a tolerable amount of errors, will give a code signal indicating the presence of a start signal. If the start code contains tolerable amount of errors, only the ≅ output will give an indication signal. If the amount of errors is too high, neither of the outputs will give an indication signal.

Upon detection of each received start signal a signal is transmitted by the ≅ output of the correlation detector KE, which is stored into the time store ZSp. This store ZSp is a chain of shift registers composed of several sections, and controlled by clock $t2$. With respect to the clock $t2$ the following relation is applicable: pulse period × positions of the shift register in one section = duration of one frame of received information. In the example of embodiment there are provided three such sections, that is, the shifting of a signal through store ZSp requires a time corresponding to three frames of the received information. Upon each clock pulse $t2$ there is stored, e.g., a "zero", with the exception of those cases where a start signal is transmitted between two clock pulses, by the correlation detector KE. In this latter case there is stored in store ZSp a "one".

The bits simultaneously appearing at the points connecting the sections, indicate the condition at a predetermined point of the frame. By a majority decision (e.g. equal to or greater than 2 out of 3), it is possible to ascertain the time positions at which start signals are to be expected within the present incoming frame.

Considering that the incoming bit clock $t1$ and the shift clock $t2$ are independent of one another, an incoming start signal in successively following frames, may fall within times adjoining each other. In order to be able to include these slight deviations as well, the information is taken off two adjoining points of the shift register at the boundary of the sections via an OR-circuit 01, 02, 03, and is then applied to the time majority decision device ZME. In the case of a positive decision, the AND-circuit U1 is enabled or released, and the next start signal from the ≅ correlation detector KE is transferred via this AND-circuit to the output line BZ for start signals.

The device ZME creates the time majority signal from the different taps of shift register ZSP. The majority output signal will be "high" if, for instance, two out of three inputs are "high". The operation of device ZME can be performed by the Motorola MTTL integrated circuit MC 4026 P.

At the highest permitted shifting speed of the start signal, and an arbitrary shifting direction, the expected start signal must still find the released AND-circuit U1. Accordingly, with respect to the expected signal there cannot be stated a given time position, but rather a time range (window). In order to be able to open these "-windows" in advance, the first section of the shift register or time store ZSp is chosen to be somewhat shorter than the other sections thereof.

The majority decision is made prior to the arrival of the new signal. Owing to the time-window control device ZF, the AND-circuit U1, subsequent to a positive decision in device ZME, is kept open for a predetermined period of time.

The time-window control device ZF controls AND gate U1. It creates a signal of matching time and level from the majority signal of device ZME.

Since only such signals are evaluated which occur during expected times, it is also possible to forward via AND-circuit U1 such start signals with respect to which errors (faults) have been detected which are coupled to the correlation receiver KE. These signals are then transmitted by the output ≅. The output ≅ , however, only transmits such start signals into the time store ZSp which are recognized as being correct.

Upon transmission of a start signal through circuit U1, there is then also enabled or released the AND-circuit U2, and the information just available at the address detector AE is transferred to an address store ASp.

This random-access store is divided into three sections or divisions, which are cyclically used for, e.g., three successively following frames. During one such frame, and subsequent to each start signal which has been recognized as being genuine (i.e. the signal appearing during the time window determined by the majority decision of device ZME), the following 5-bit address code is stored in the presently used division or section of store ASp. After the end of the frame, there is effected a switch of the information to the next division or section of store ASp. The old addresses which were stored in this division or section until then, are erased, and the new ones are stored in a known manner. Switching from one section to the next one is controlled by the clock pulse $t3$ via the store control device St.

The store control device St contains the timing control logic and the internal store address control logic for the address store ASp. The device is therefore able to distribute enable signals to the three sections of the store as well as for the lines (horizontal rows) of each section of the store ASp.

For storing the addresses, the lines (or rows) are addressed by the control device St successively in an upward order of sequence, now being controlled by the start signals.

In the device AME, serving to make the address majority decision there is now obtained, from the addresses as stored in the same line in the various sections, and again by way of majority decision, for instance, two out of three for each bit of the received and stored station's address, the address of the station, which is then forwarded over the line A for further processing. This majority decision will lead to a correction of any faulty received addresses. In order to avoid any disturbances during the storing of the addresses, the clock pulse $t3$ controlling the section switchover via device St is appropriately derived from the reception of the own address. Device AME can be the Motorola MTTL integrated circuit MC 4026 P.

Start signals not appearing during an opened "window", are first of all regarded as imitations, and are therefore not transferred over line BZ. They are, nevertheless, stored in the shift register or store ZSp and are, thereafter, included in the majority decision.

Figure 2:
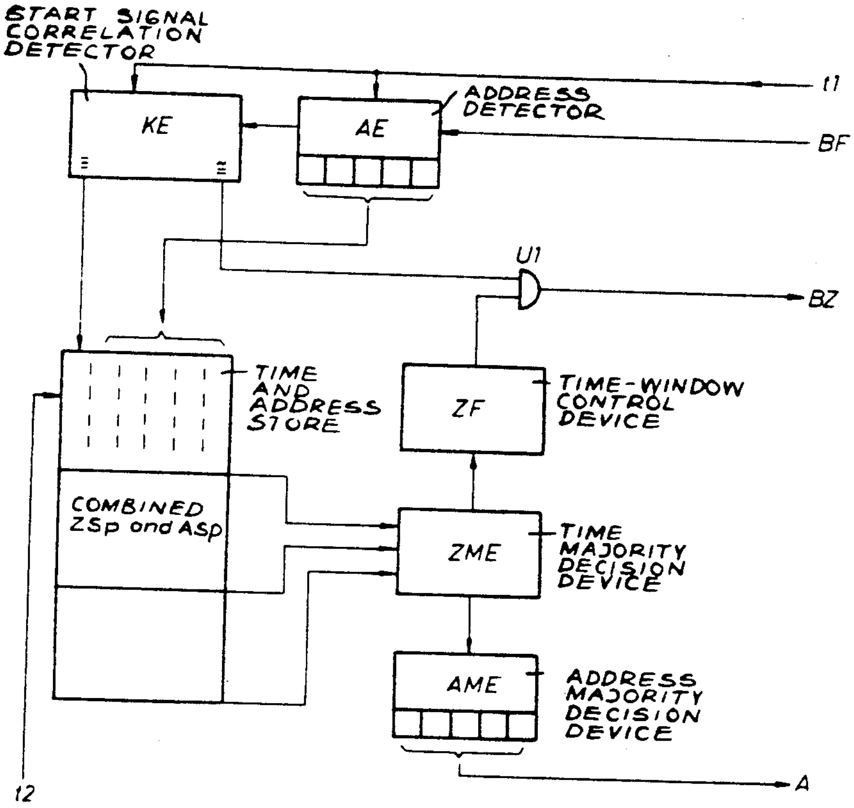
FIG. 2 shows a block diagram of a second embodiment of the detection system in accordance with the principles of the present invention.

FIG. 2 shows a modified embodiment of the embodiment of FIG. 1 in which identical devices are indicated by the same reference as in FIG. 1.

In this embodiment, the received start signals and addresses are now stored in common in paralled form, in a correspondingly larger shift register, in time and address store ZSp and ASp. This store is also shifted during the clock pulse $t2$.

This arrangement, of course, requires a larger shift register, but this is compensated for by the fact that, in the case of a new access to a station, the address majority decision can be made immediately after the time majority decision. The address majority decision in device AME is always made dependent upon the existence of a time majority decision in device ZME.

While we have described above the principles of our invention in connection with specific apparatus, it is to be clearly understood that this description is only made by way of example and not as a limitation to the scope of our invention as set forth in the objects thereof and in the accompanying claims.

We claim:

1. A system for detecting in a frame period the beginning of the transmit-time of both the message bursts and the address of each of a plurality of different stations in an asynchronous time division multiplex communication system via a communications satellite comprising:

a source of bit stream including an address code and a message burst start signal code;

first means coupled to said source to detect said address code in a given time slot of each of said frame periods;

second means coupled to said first means to detect said start signal code in said given time slot of each of said frame periods and produce an identifying signal when said start signal is thusly detected;

third means coupled to said second and first means to store said identifying signal of the preceding N frame periods and to store said address code of the corresponding preceding N frame periods, where N is an integer greater than two;

fourth means coupled to said second means and said third means to determine by a first majority decision the actual presence of said start signal in said given time slot and to pass the next one of said start signal code for processing upon occurrence of a first positive majority decision; and fifth means coupled to said first means, said third means and said fourth means to determine, in response to said first positive majority decision, by a second majority decision the actual presence of said address code in said given time slot and to pass the next one of said address code for processing upon occurrence of a second positive majority decision.

2. A system according to claim 1, wherein said third means includes a first shift register having N section to store said identifying signal produced in N successive frame periods, and a second shift register having at least N sections to store said address code detected in N successive frame periods.

3. A system according to claim 1, wherein said third means includes a shift register having N sections coupled in common to said second means and said first means to store said identifying signal produced in N successive frame periods and to store said address code detected in said N successive frame periods.

4. A system according to claim 1, wherein said fourth means includes a first majority decision circuit coupled to said third means, a gate pulse generator coupled to said first majority decision circuit, and a first AND-circuit coupled to said second means and said gate pulse generator enabled by an output signal of said gate pulse generator to pass the next one of said start signal code for processing upon occurrence of said first positive majority decision.

5. A system according to claim 4, wherein said fifth means includes a second majority decision circuit coupled to said first majority decision circuit.

6. A system according to claim 4, wherein said third means includes a first shift register having N sections to store said identifying signal produced in N successive frame periods, a second shift register having N sections to store said address code detected in N successive frame periods, and a second AND-circuit coupled to said second means and said first AND-circuit, said second AND-circuit being enabled by said next one of said start signal code to shift the address code coincident therewith into said second shift register.

7. A system according to claim 5, wherein said third means further includes a timing source, a control means coupled to said second shift register, said timing source and said first AND-circuit to control the shifting of address codes between adjacent ones of said N sections of said second shift register.

8. A system according to claim 5, wherein said fifth means includes a second majority decision circuit coupled to said second shift register.

9. A system according to claim 1, wherein said third means includes a shift register having N sections coupled in common to said second means and said first means to store said identifying signal produced in N successive frame periods and to store said address code detected in said N successive frame periods;

said fourth means includes a first majority decision circuit coupled to said shift register, a gate pulse generator coupled to said first majority decision circuit, and an AND-circuit coupled to said second means and said gate pulse generator enabled by an output signal of said gate pulse generator to pass the next one of said start signal code for processing upon occurrence of said first positive majority decision; and said fifth means includes a second majority decision circuit coupled to said first majority decision circuit.

* * * * *